United States Patent
Yamanaka et al.

(10) Patent No.: US 11,847,078 B2
(45) Date of Patent: *Dec. 19, 2023

(54) SEMICONDUCTOR DEVICE AND METHOD FOR PROTECTING BUS

(71) Applicant: RENESAS ELECTRONICS CORPORATION, Tokyo (JP)

(72) Inventors: Sho Yamanaka, Tokyo (JP); Toshiyuki Hiraki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,061

(22) Filed: Jan. 11, 2023

(65) Prior Publication Data

US 2023/0161722 A1    May 25, 2023

Related U.S. Application Data

(63) Continuation of application No. 17/395,945, filed on Aug. 6, 2021, now Pat. No. 11,580,043, which is a
(Continued)

(51) Int. Cl.
*G06F 13/36* (2006.01)
*G06F 13/362* (2006.01)
(Continued)

(52) U.S. Cl.
CPC ........ *G06F 13/362* (2013.01); *G06F 11/0772* (2013.01); *G06F 11/1004* (2013.01); *G06F 13/1668* (2013.01); *G06F 13/387* (2013.01)

(58) Field of Classification Search
CPC .......... G06F 13/16; G06F 13/38; G06F 11/10; G06F 11/07; G06F 13/362
See application file for complete search history.

(56) References Cited

U.S. PATENT DOCUMENTS 9,135,202 B2   9/2015  Balkan et al.
10,565,146 B2  2/2020  Hopkins et al.
(Continued)

FOREIGN PATENT DOCUMENTS

JP    2010-211347 A    9/2010

OTHER PUBLICATIONS

U.S. PTO Non-Final Office Action issued in related parent U.S. Appl. No. 16/859,387, dated Jan. 26, 2021.
(Continued)

*Primary Examiner* — Henry Tsai
*Assistant Examiner* — Christopher A Daley
(74) *Attorney, Agent, or Firm* — Rimon P.C.; Tomoki Tanida (57) ABSTRACT

The master interface generates copy data by copying the first data, and generates an error detection code based on the copy data. The protocol conversion unit generates the second data by converting the first data from the first protocol to the second protocol. The slave interface detects errors in the copy data based on the error detection code. The slave interface also generates the first verification data by performing a conversion from one of the first protocol or the second protocol to the other for one of the second data or copy data. In addition, the slave interface compares the second verification data with the first verification data, using the other of the second data or copy as the second verification data.

5 Claims, 8 Drawing Sheets

Related U.S. Application Data continuation of application No. 16/859,387, filed on Apr. 27, 2020, now Pat. No. 11,113,218.

(51) Int. Cl.
    *G06F 11/07*      (2006.01)
    *G06F 11/10*      (2006.01)
    *G06F 13/16*      (2006.01)
    *G06F 13/38*      (2006.01)

(56) References Cited

U.S. PATENT DOCUMENTS

| | | |
|---|---|---|
| 11,113,218 B1 | 9/2021 | Yamanaka |
| 2003/0217294 A1 | 11/2003 | Kyle |
| 2004/0205278 A1 | 10/2004 | Higuchi et al. |
| 2010/0229077 A1 | 9/2010 | Sugita |
| 2011/0055439 A1 | 3/2011 | Chen et al. |
| 2011/0173443 A1 | 7/2011 | Osterwalder et al. |

OTHER PUBLICATIONS

U.S. PTO Notice of Allowance issued in related parent U.S. Appl. No. 16/859,387, dated May 7, 2021.
Parent U.S. Appl. No. 16/859,387, filed Apr. 27, 2020.
U.S. PTO Non-Final Office Action issued in related parent U.S. Appl. No. 17/395,945, dated Jun. 7, 2022.
U.S. PTO Notice of Allowance issued in related parent U.S. Appl. No. 17/395,945 dated Oct. 20, 2022.

| ADDRESS | BURST TYPE | SIZE | LENGTH |
|---------|------------|------|--------|

SEMICONDUCTOR DEVICE AND METHOD FOR PROTECTING BUS

CROSS-REFERENCE TO RELATED APPLICATIONS

This application is a Continuation of U.S. patent application Ser. No. 17/395,945, filed on Aug. 6, 2021, which is a Continuation of U.S. patent application Ser. No. 16/859,387, filed on Apr. 27, 2020, now U.S. Pat. No. 11,113,218, issued on Sep. 7, 2021, the specification, drawings and abstract are incorporated herein by reference in their entirety.

BACKGROUND

The present invention relates to methods of protecting semiconductor device and buses.

There is disclosed technique listed below.
[Patent Document 1] Japanese Unexamined Patent Application Publication No. 2010-211347

In order to protect buses, Patent Document 1 discloses information processing device using error-detection codes (EDC: Error Detecting Code). The information processing device of Patent Document 1 includes an error detection code generation unit and an error detection unit. The error detection code generation unit generates EDC based on the address data from the bus master. The error detection unit generates EDC based on the address data corresponding to the bus slave, and compares it with EDC from the error detection code generation unit.

SUMMARY

Bus may use multiple protocols, not just a single protocol, such as Patent Document 1. In this case, protocol conversion is performed as appropriate in the bus. Then, the data to be protected by EDC may change each time that a protocol conversion is performed. As a result, it was feared that it would be difficult to protect buses.

Other objects and novel features will become apparent from the description of this specification and the accompanying drawings.

Semiconductor device of an embodiment includes a bus master and a bus slave, a master interface provided between the bus master and the bus, a slave interface provided between the bus slave and the bus, and a protocol conversion unit provided in the bus. The bus master outputs the first data generated based on the first protocol. The master interface includes a copy data generation unit for generating copy data by copying the first data, and a code generation unit for generating an error detection code based on the copy data. The protocol conversion unit generates the second data by converting the first data from the first protocol to the second protocol. The slave interface is inputted with a second data, copy data, and error detection code, and includes an error detection unit, a protocol conversion unit for verification, and a comparator. The error detection unit detects the error of the copy data based on the error detection code. The protocol conversion unit for verification generates the first verification data by converting from one of the first protocol or the second protocol to the other for one of the second data or copy data. The comparator compares the second verification data with the first verification data, using the other of the second data or copied data as the second verification data.

Using semiconductor device of one embodiment enables the bus to be protected even if the bus is protocol-converted.

DETAILED DESCRIPTION

In the following embodiments, when required for convenience, the description will be made by dividing into a plurality of sections or embodiments, but except when specifically stated, they are not independent of each other, and one is related to the modified example, detail, supplementary description, or the like of part or all of the other. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle. Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

DETAILED DESCRIPTION OF THE INVENTION

In all the drawings for explaining the embodiments, members having the same functions are denoted by the same reference numerals, and repetitive descriptions thereof are omitted. In the following embodiments, descriptions of the same or similar parts will not be repeated in principle except when particularly necessary.

First Embodiment (Configuration of Semiconductor Device and Operation)

Figure 1A:
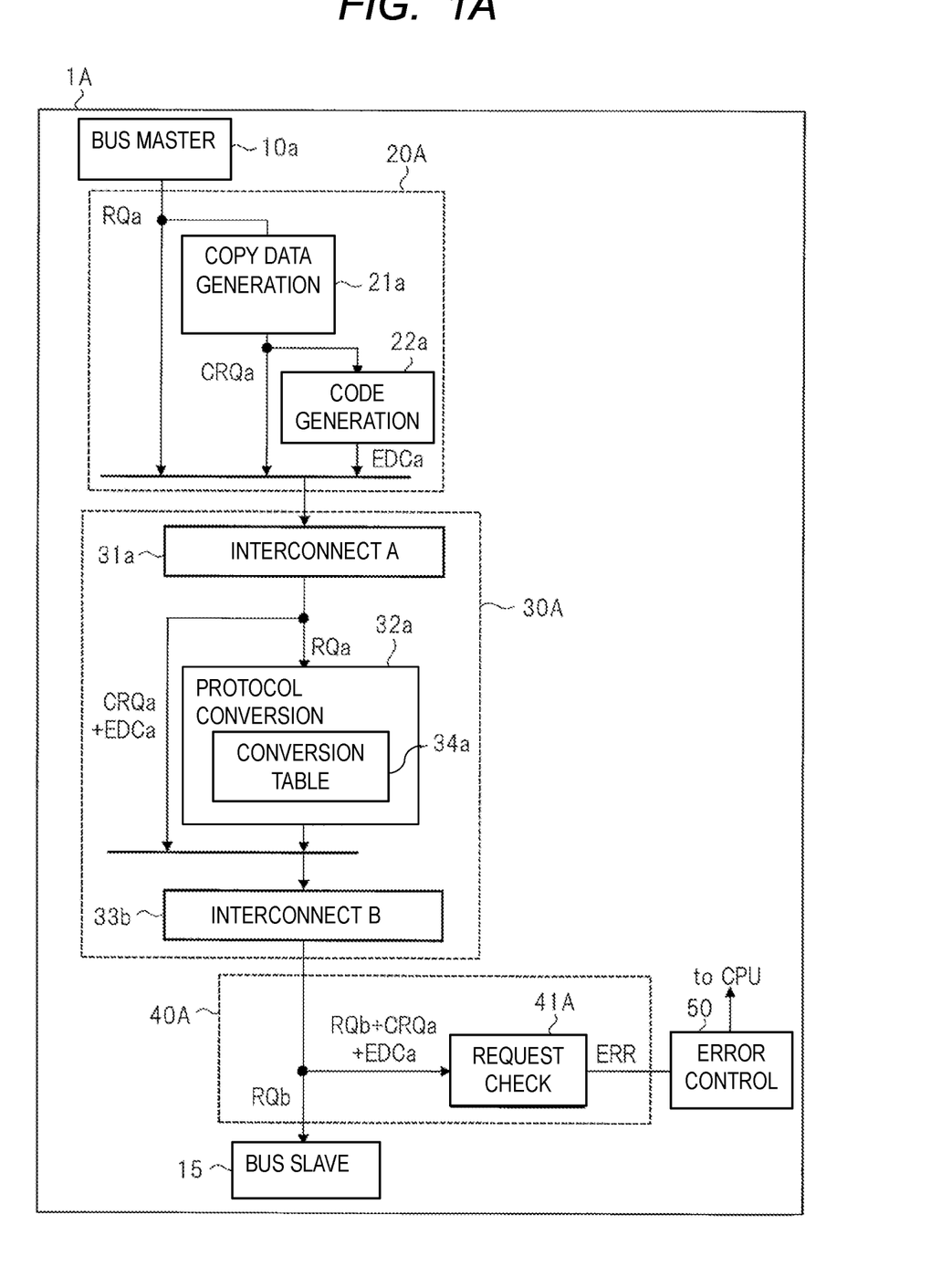
FIG. 1A is a block diagram showing a configuration example of a main part in semiconductor device according to first embodiment of the present invention.
Figure 1B:
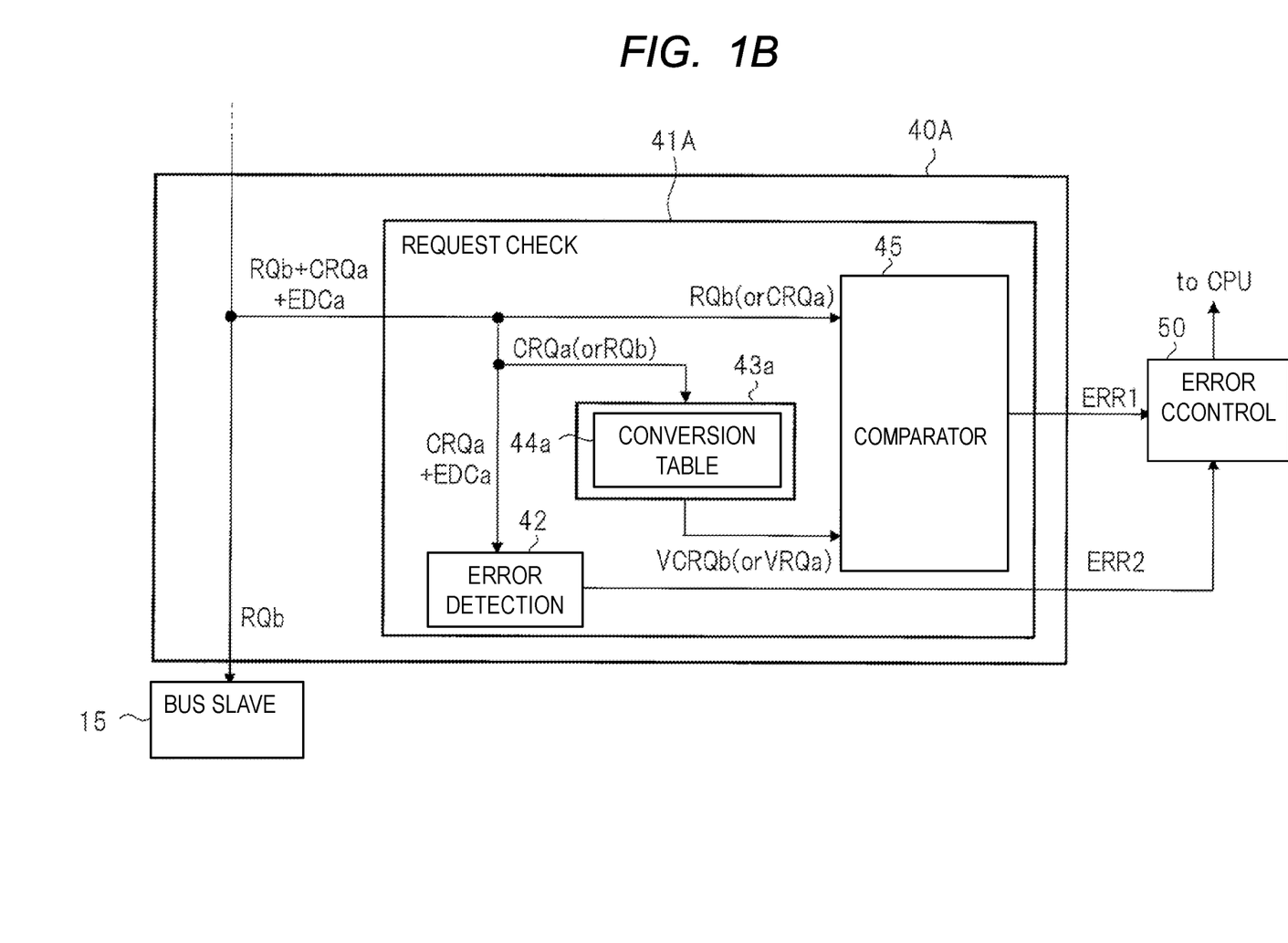
FIG. 1B is a block diagram showing a configuration example of a main portion of the slave interface in the FIG. 1A.
Figure 2:
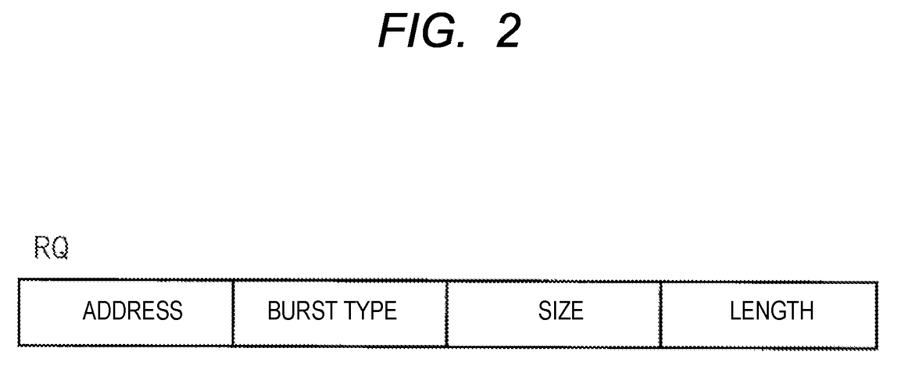
FIG. 2 is a schematic diagram showing a configuration example of the request data in FIG. 1.

FIG. 1A is a block diagram showing a configuration example of a main part in semiconductor device according to first embodiment of the present invention. FIG. 1B is a block diagram showing a configuration example of a main portion of the slave interface in the FIG. 1A. FIG. 2 is a schematic diagram showing a configuration example of the request data in FIG. 1. Semiconductor device 1A in FIG. 1A is composed of one semiconductor chip, for example, a microcontroller, a SoC (System on Chip) or the like.

Semiconductor device 1A of FIG. 1A includes a bus master 10a, a master interface 20A, a bus 30A, a slave interface 40A, a bus slave 15, and an error control unit 50. The bus master 10a performs various requests to the bus slave 15 via the bus 30A. In response, the bus slave 15 performs various responses to the bus master 10a via the bus 30A.

The master interface 20A is provided between the bus master 10a and the bus 30A corresponding to the bus master 10a and is an interface between the bus master 10a and the bus 30A. The slave interface 40A is provided between the bus slave 15 and the bus 30A corresponding to the bus slave 15 and is an interface between the bus slave 15 and the bus 30A. The bus 30A includes a protocol conversion unit 32a, and connects between the master interface 20A and the slave interface 40A.

Here, in example of FIG. 1A, the bus master 10a outputs the request data (first data) RQa generated based on the protocol A. As shown in FIG. 2, request data RQ (RQa) includes, for example, information of the address, information of the burst type, information of the burst data size, information of the burst length, etc. However, the request data RQ may be constructed on a variety of formats depending on the protocol being used, not limited thereto.

The master interface 20A includes a copy data generation unit 21a and a code generation unit 22a. The copy data generation unit 21a generates a copy data CRQa by copying the request data RQa. The code generation unit 22a generates an error detection code EDCa based on the copy-data CRQa. Then the master interface 20A outputs the request data RQa, the copy data CRQa, and the error detection code EDCa to the bus 30A.

The bus 30A, a protocol conversion unit 32a is provided. The protocol conversion unit 32a generates the request data RQb (second data) by converting the request data RQa from the master interface 20A from protocol A to the protocol B. Specifically, the protocol conversion unit 32a, for example, the correspondence between the data format based on the protocol A and the data format based on the protocol B is defined in the protocol conversion table 34a in advance. Protocol conversion table 34a, for example, is configured by using a logic circuit, or is configured by combining a storage circuit in the logic circuit. Protocol conversion unit 32a performs protocol conversion based on the protocol conversion table 34a.

Further, in this example, for simplicity, although one bus master 10a and one bus slave 15 is provided, a single or a plurality of bus masters, and a single or a plurality of bus slaves may be configured to be provided. In this case, the interconnectors 31a, 33b are provided in the bus 30A. Inter connector 31a is provided on the protocol A side of the protocol conversion unit 32a, and the inter connector 33b is provided on the protocol B side of the protocol conversion unit 32a. Interconnectors 31a, 33b, for example, using a selector or the like, to determine the connection relationship between the one or more bus masters and the one or more bus slaves.

A request data RQb from the bus 30A, a copy data CRQa, and an error detection code EDCa are input to the slave interface 40A. Within this, the copy data CRQa and the error detection code EDCa are generated by the master interface 20A and pass through the bus 30A as is. The slave interface 40A includes a request check unit 41A for detecting an error in the request data RQb. The slave interface 40A transmits the input request data RQb to the bus slave 15 and processes the input request data RQb, copy data CRQa, and error detection code EDCa using the request check unit 41A.

Request check unit 41A, as shown in FIG. 1B, includes an error detection unit 42, a verification protocol conversion unit 43a, and a comparator 45. The error detection unit 42 detects an error of the input copy data CRQa based on the input error detection code EDCa. Specifically, the error detection unit 42 generates an error detection code for verification based on the copy data CRQa. Then, the error detection unit 42 compares the error detection code for the verification and the input error detection code EDCa. The error detection unit 42 determines that there is no error when the comparison result is a match, and determines that there is an error when the comparison result is a mismatch. In this manner, the error detection unit 42 confirms that the copy data CRQa from the master interface 20A is transmitted normally to the slave interface 40A.

The verification protocol conversion unit 43a and the comparator 45 operate in either the following operation method (1) or the operation method (2). In the operation method (1), the verification protocol conversion unit 43a generates the first verification data VCRQb by performing the same protocol conversion (i.e., positive conversion) with the copy data CRQa as the protocol conversion unit 32a in the bus 30A. Here, since the first verification data VCRQb is generated from the copied data CRQa confirmed by the error detection unit 42, it can be regarded as the correct expectation data.

The comparator 45 compares the second verification data with the first verification data VCRQb that becomes the expected value data from the verification protocol conversion unit 43a using the input request data (second data) RQb as the second verification data. Then, the comparator 45 determines that there is no error when the comparison result is a match, and that there is an error when the comparison result is a mismatch.

Thus, the comparator 45 can detect an error in the input request data (second data) RQb. For example, when a physical failure occurs in the protocol conversion unit 32a in the bus 30A, unless the same physical failure occurs in the verification protocol conversion unit 43a, the physical failure of the protocol conversion unit 32a can be detected. The protocol conversion unit 32a and the verification protocol conversion unit 43a are usually laid out at a physically remote position. Therefore, the likelihood of the same physical failure occurring is nearly zero.

On the other hand, the operation method (2) is a method in which the input copy data CRQa is used as the expected value data as it is. In the operation method (2), the verification protocol conversion unit 43a generates the first verification data VRQa by performing an inverse conversion to the original conversion performed by the protocol conversion unit 32a in the bus 30A to the input request data (second data) RQb.

On the other hand, the entered copied data CRQa is defined in the second verification data. The copy data (second verification data) CRQa, with the operation of the error detection unit 42, can be regarded as the correct expected value data. The comparator 45 compares the first verification data VRQa from the verification protocol conversion unit 43$a$ with the copy data (second verification data) CRQa. Thus, the comparator 45 can detect an error in the input request data (second data) RQb.

As described above, the verification protocol conversion unit 43$a$ generates the first verification data by performing a conversion (i.e., a forward conversion or a reverse conversion) from one of the protocols A or B to the other (i.e., a forward conversion or a reverse conversion) for one of the request data (second data) RQb or the copied data CRQa from the protocol conversion unit 32$a$. On the other hand, the comparator 45 compares the second verification data with the first verification data from the verification protocol conversion unit 43$a$ using the RQb (second data) or the copy data CRQa from the protocol conversion unit 32$a$ as the second verification data.

For example, when using the operation method (1), the verification protocol conversion unit 43$a$ can, for example, use the same protocol conversion table as the protocol conversion table 34$a$ provided in the protocol conversion unit 32$a$ in the bus 30A. In this case, it is possible to facilitate the design, etc. From such a viewpoint, it is preferable to use the operation method (1) rather than the operation method (2).

Further, when detecting an error, the error detection unit 42 outputs an error detection signal ERR2 to the error control unit 50. Similarly, when detecting an error, the comparator 45 outputs an error detection signal ERR1 to the error control unit 50. Error control unit 50 is, for example, an interrupt controller or the like, when the error detection signal ERR1,ERR2 is input, notifies an error to the CPU (Central Processing Unit) or the like.

As exemplary embodiments of FIGS. 1A and 1B, the bus master 10$a$ is a processor such as a CPU or GPU (Graphics Processing Unit). The bus slave 15 is a memory controller that accesses memories such as, for example, DRAM(Dynamic Random. Access Memory), SRAM(Static Random Access Memory, and the like. In this case, the bus slave 15 generates various access control signals to the memory in response to the request data RQb.

Protocol conversion unit 32$a$, for example, converts the interface protocol of AXI (Advanced extensible Interface) to the bus protocol of AHB (Advanced High Performance Bus). Incidentally, semiconductor device 1A may include a configuration portion connected to the first of the bus slave 15 (e.g., memory, etc.).

(How to Protect the Bus)

Figure 3:
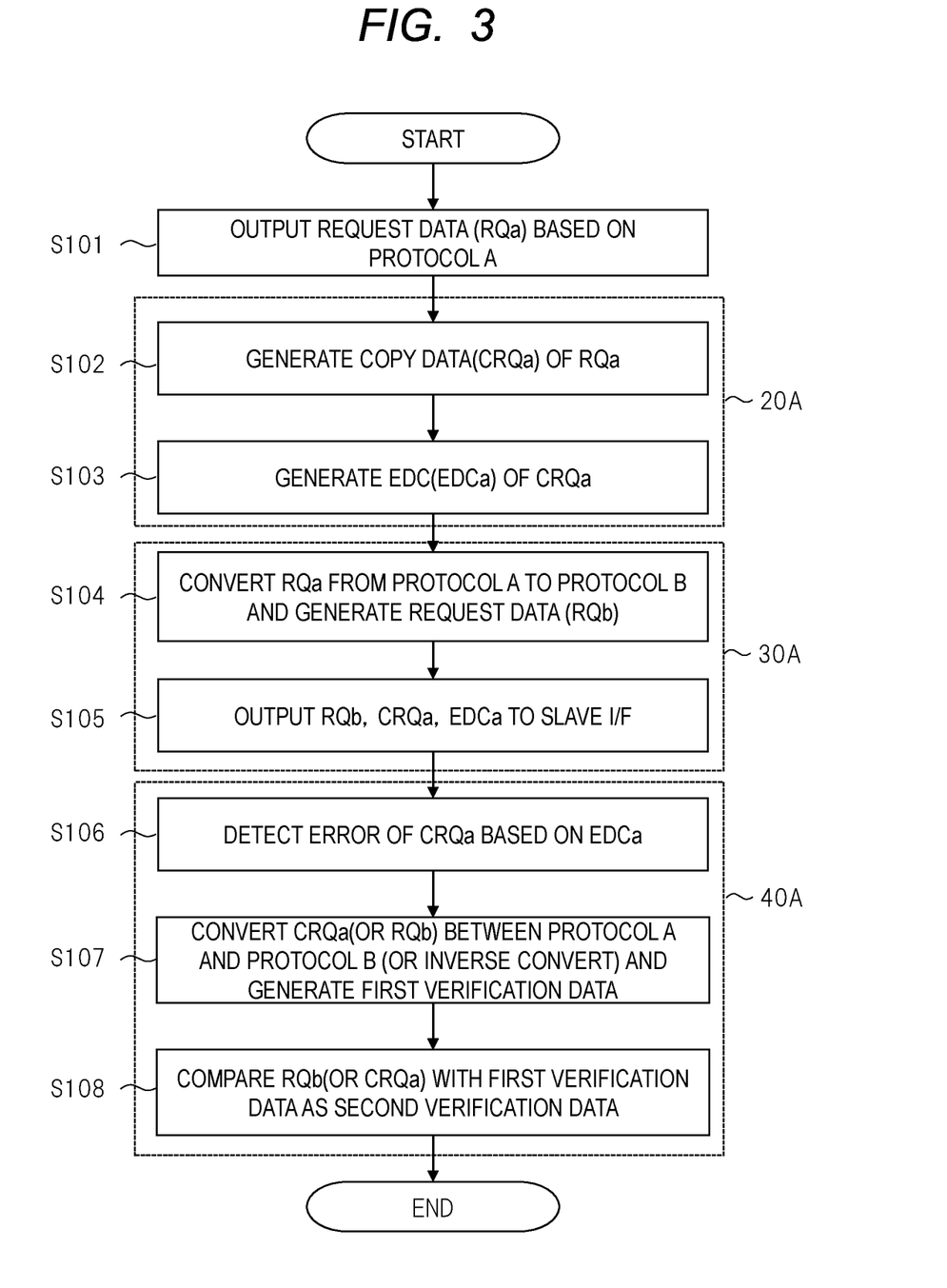
FIG. 3 is a flowchart showing an exemplary process of protecting buses according to the present first embodiment.

FIG. 3 is a flowchart showing an exemplary process of protecting buses according to the present first embodiment. The way to protect the bus is not limited to a bus in a semiconductor device (semiconductor chip), but in some cases can be applied to a bus connecting the semiconductor chips. In FIG. 3, first, the bus master 10$a$ outputs the generated request data (first data) RQa based on the protocol A (step S101).

Then, the master interface 20A generates a copy data CRQa by copying the request data RQa (step S102). The master interface 20A generates an error detection code EDCa based on the copy data CRQa (step S103). The master interface 20A then outputs the request data RQa, the copy data CRQa, and the error detection code EDCa to the bus 30A.

Then, the protocol conversion unit 32$a$ in the bus 30A generates the request data (second data) RQb by converting the request data (first data) RQa from the protocol A to the protocol B (step S104). The bus 30A outputs the request data RQb to the slave interface 40A and directly outputs the copy data CRQa and the error detection code EDCa (step S105).

Then, the slave interface 40A detects the error of the input copy data CRQa based on the error detection code EDCa (step S106).

The slave interface 40A also generates the first verification data by performing a conversion from one of the protocols A or B to the other for either the input request data (second data) RQb or the copy data CRQa (step S107). The slave interface 40A then compares the second verification data with the first verification data, using the other of the request data RQb or copy data CRQa as the second verification data (step S108).

Hereinafter, in order to simplify the description, the slave interface 40A uses the aforementioned operation method (1) (i.e., a method for performing a positive conversion). Of course, the operation method (1) can be replaced by the operation method (2) as appropriate.

(Modified Example of Semiconductor Device)

In FIGS. 1A and 1B, the master interface 20A copied all areas of the request data RQa as target. However, the master interface 20A may copy some areas of the request data RQa as target. Specifically, the request data RQa may be separated into the target area of the protocol conversion and the non-target area in advance. As an example of the interface protocol of AXI, a non-target area is mentioned, for example, a region of a transaction ID, etc., and an area of an address, etc. is mentioned as a target area. In this case, the master interface 20A may generate copy data by copying only data of the target area.

Figure 4:
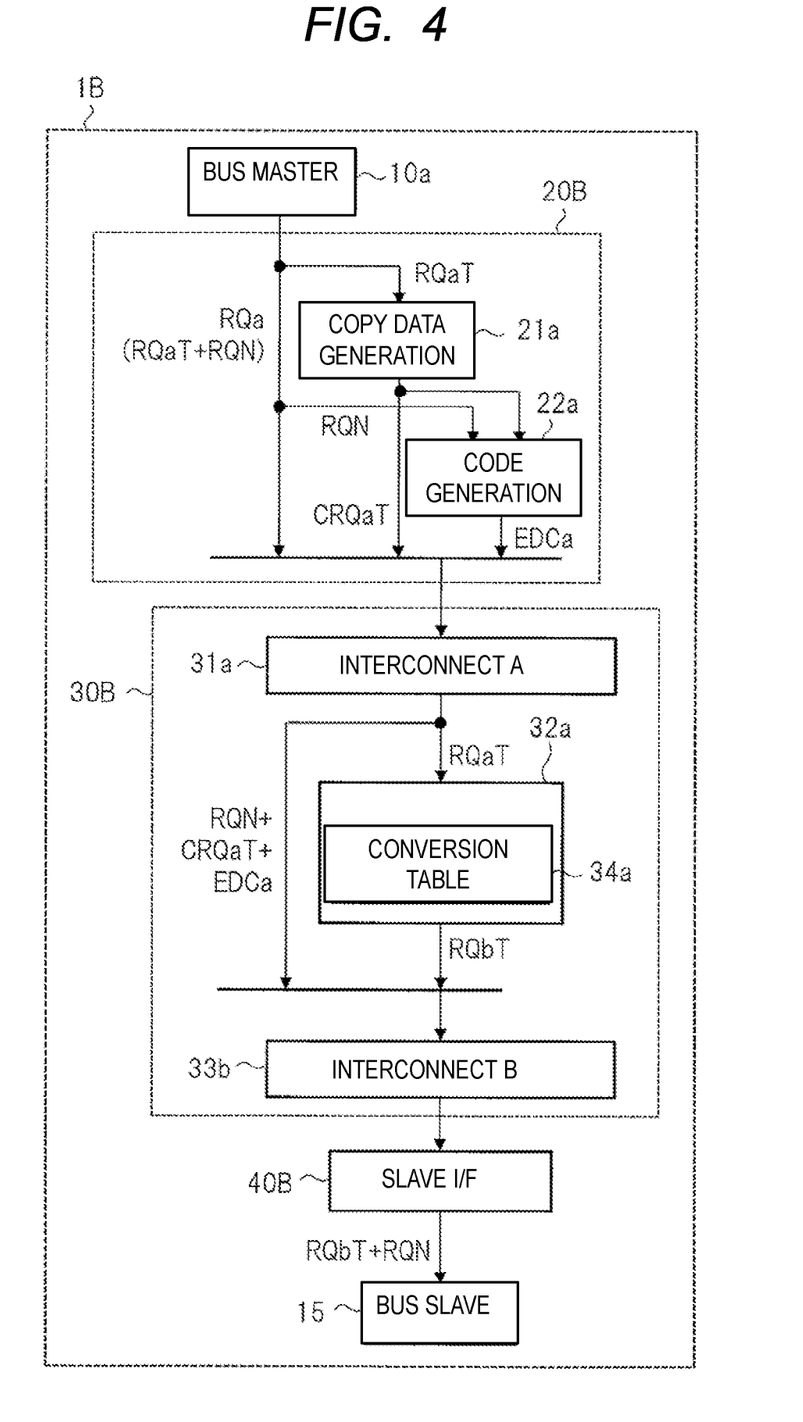
FIG. 4 is a block diagram showing a configuration example in which semiconductor device of FIG. 1A is modified.

FIG. 4 is a block diagram showing a configuration example in which semiconductor device of FIG. 1A is modified. In semiconductor device 1B of FIG. 4, the request data RQa from the bus master 10$a$ is composed of a data RQaT of the target area and a data RQN of the non-target area. In this case, the copy data generation unit 21$a$ in the master interface 20B generates a copy data CRQaT by copying the data RQaT of the target area. The code generation unit 22$a$ generates an error detection code EDCa based on the combination of the copy data CRQaT and the data RQN of the non-target area.

Protocol conversion unit 32$a$ in the bus 30B outputs the data RQbT of the target area by protocol converting the data RQaT of the target area. The bus 30B outputs to the slave interface 40B a data RQbT of the target area, a data RQN of the non-target area, a copy data CRQaT, and an error detection code EDCa.

The slave interface 40B outputs the data RQbT of the target area and the data RQN of the non-target area to the bus slave 15. Further, in the FIG. 1B, the code generation unit 42 confirms that the copy data CRQaT and the data RQN of the non-target area are correctly transmitted based on the error detection code EDCa. Further, the verification protocol conversion unit 43$a$ generates the first verification data by protocol conversion of the copy data CRQaT. The comparator 45 compares the first verification data with the data of the input target area (second verification data) RQbT, detects errors in the data RQbT of the target area.

As for the data RQN of the non-target area that is output to the bus slave 15 together with the data RQbT of the target area, an error is detected by the code generation unit 42. By using such a configuration, as compared with the configuration of the FIG. 1A, for example, it is possible to reduce the number of wires and the like due to the transmission of the copy data CRQaT.

(Main Effects of First Embodiment)

As described above, in the method of first embodiment, the copy data CRQa generated by the master interface 20A and the corresponding error detection code EDCa are transmitted to the slave interface 40A. Thus, even when a protocol conversion is performed between the master interface 20A and the slave interface 40A, the correct expected value data can be obtained on the slave interface 40A. As a result, even the bus 30A where the protocol conversion is performed can protect the bus 30A.

Further, it is possible to efficiently (e.g., in a small area) the protection of the bus 30A. As a comparative example, a method of performing the regeneration of the error check and EDC based on EDC each time the protocol conversion is performed is considered. In this case, the same configuration unit as the code generation unit 22a of FIG. 1A and the error detection unit 42 of FIG. 1B is provided in the subsequent stage of the protocol conversion unit Further, to detect the error of the protocol conversion unit itself, duplexing or the like of the protocol conversion unit is performed. Then, such a mechanism is provided in each protocol conversion unit.

On the other hand, in first embodiment system, as described above, correct expected value data can be obtained on the slave interface 40A. Therefore, for example, in FIG. 1A, further, even when another bus master is added in parallel with the bus master 10a, there is no need to provide a mechanism as described above for each protocol conversion unit. Specifically, another bus master is connected to the interconnect 33b through a different interconnect and protocol conversion than the interconnect 31a and protocol conversion unit 32a.

Further, for example, in FIG. 1A, even when the protocol conversion unit is composed of a plurality of stages of protocol conversion units connected in series, there is no need to provide a mechanism as described above for each protocol conversion unit. Specifically, the protocol conversion unit, a protocol conversion unit for converting from protocol A to protocol C is provided in a subsequent stage, a form consisting of a protocol conversion unit for converting from protocol C to protocol B.

In this case, the verification protocol conversion unit 43a of FIG. 1B, based on the ingress protocol (protocol A) and the egress protocol (protocol B) in the protocol conversion unit of the plurality of stages, it is sufficient to perform a conversion from the protocol A to the protocol B. Of course, the verification protocol conversion unit 43a, although the processing may be redundant, after performing a conversion from the protocol A to the protocol C, it may perform a conversion from the protocol C to the protocol B.

Second Embodiment (Configuration of Semiconductor Device and Operation)

Figure 5A:
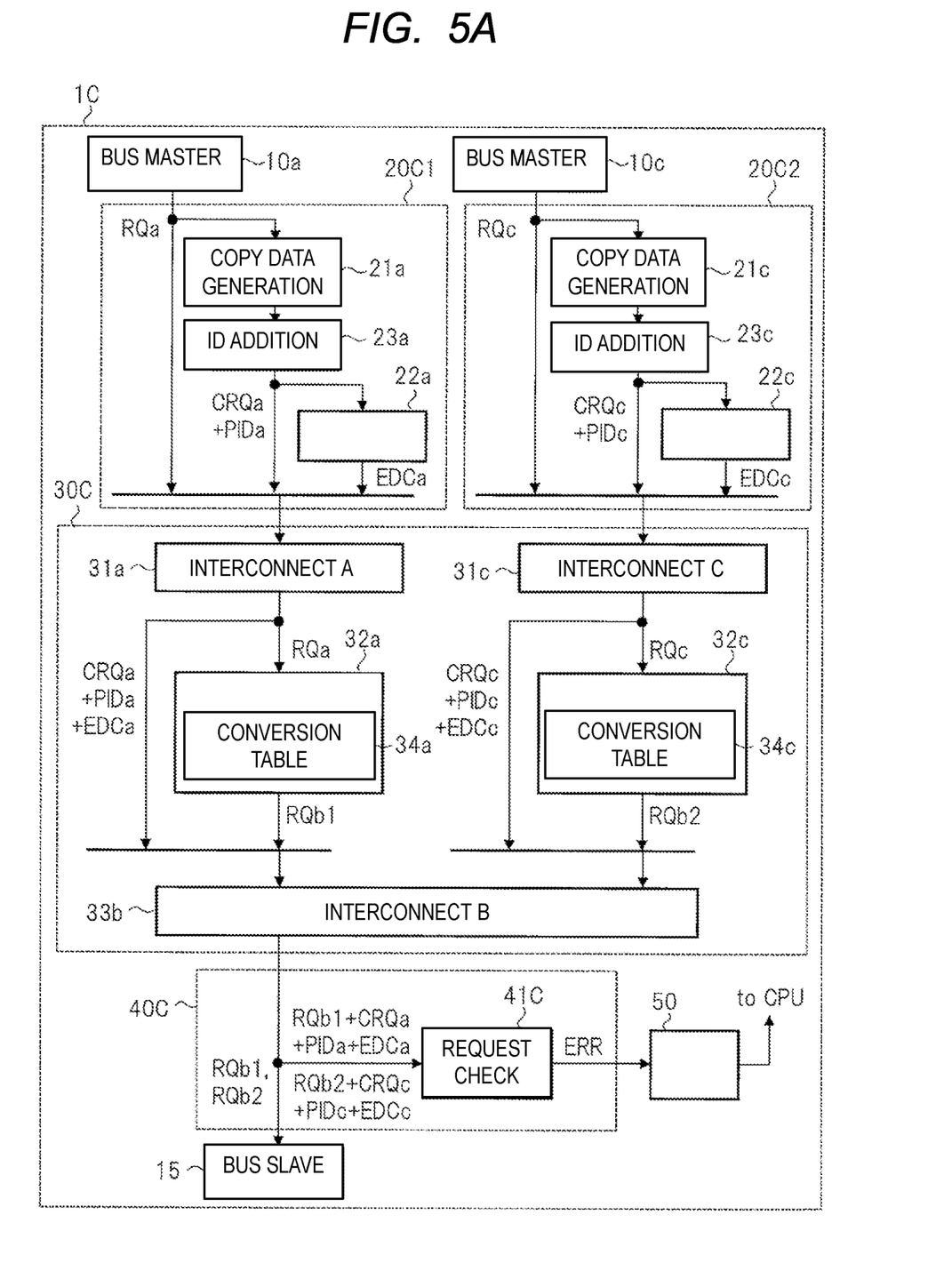
FIG. 5A is a block diagram showing a configuration example of a main part in semiconductor device according to second embodiment of the present invention.
Figure 5B:
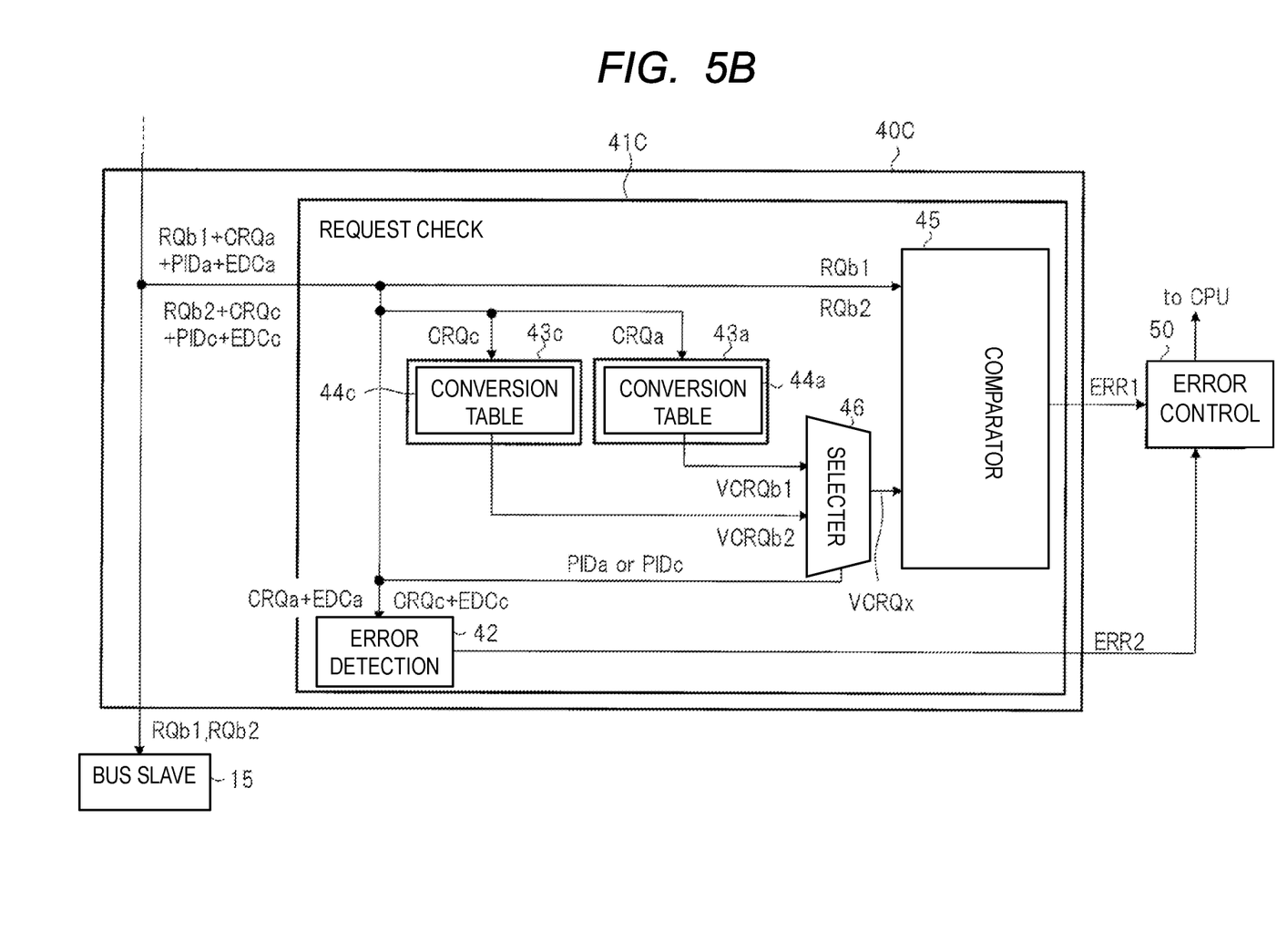
FIG. 5B is a block diagram showing a configuration example of a main part of the slave interface in the FIG. 5A.
Figure 6:
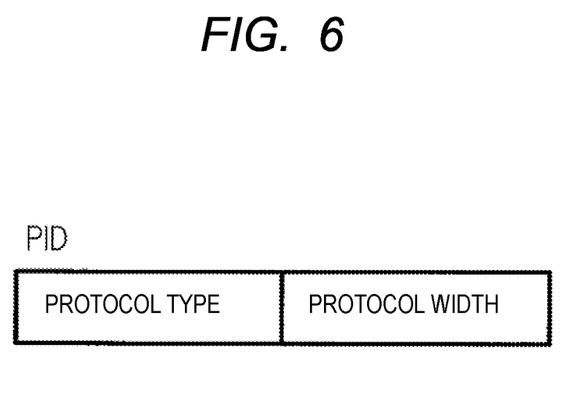
FIG. 6 is a schematic diagram showing a configuration example of a protocol identifier (ID) in FIG. 1.

FIG. 5A is a block diagram showing a configuration example of a main part in semiconductor device according to second embodiment of the present invention. FIG. 5B is a block diagram showing a configuration example of a main portion of the slave interface in the FIG. 5A. FIG. 6 is a schematic diagram showing a configuration example of a protocol identifier (ID) in FIG. 1.

Semiconductor device 1C shown in FIG. 5A is provided with a plurality of sets (two sets in this example) of bus masters, master interfaces, and protocol conversion sections, unlike the case of FIG. 1A. The bus master 10a, the master interface 20C1, and the protocol conversion unit 32a in the first set are the same as those of the bus master 10a, the master interface 20A, and the protocol conversion unit 32a of the FIG. 1A. However, unlike the FIG. 1A, in the master interface 20C1, the identifier addition unit 23a is provided.

The bus master 10c in the second set, the master interface 20C2, and the protocol conversion unit 32c include a configuration similar to that of the first set. However, the second set and the first set differ in the protocol handled. That is, the bus master 10a in the first set outputs request data RQa based on protocol A, as in the case of the FIG. 1A. The bus master 10c in the second set outputs the request data RQc based on protocol C.

Here, in the master interface 20C1, the identifier addition unit 23a adds a protocol identifier PIDa representing the protocol (i.e., protocol A) used in the corresponding bus master 10a to the copy data generation unit 21a to the copy data CRQa. The code generation unit 22a generates an error detection code EDCa based on a combination of the copy data CRQa and the protocol identifier PIDa.

Similarly, in the master interface 20C2, the identifier addition unit 23c adds the protocol identifier PIDc representing the protocol (i.e., protocol C) used in the corresponding bus master 10c to the copy data generation unit 21c. The code generation unit 22c generates an error detection code EDCc based on a combination of the copy data CRQc and the protocol identifier PIDc. Incidentally, each protocol identifier PID (PIDa,PIDc) includes, for example, information of the protocol type, information of the protocol width, etc., as shown in FIG. 6.

The request data RQa, copy data CRQa, protocol identifier PIDa, and error detection code EDCa output from the master interface 20C1 are inputted to the interconnect 31a in the bus 30C. In contrast, the request data RQc, copy data CRQc, protocol identifier PIDc, and error detection code EDCc output from the master interface 20C2 are input to the interconnect 31c in the bus 30C.

The bus 30C includes, in addition to the interconnects 31a and 31c, a protocol conversion unit 32a in the first set, a protocol conversion unit 32c in the second set, and an interconnect 33b. Protocol conversion unit 32a, 32c, the protocol used by the corresponding bus master, both convert to protocol B.

Specifically, the protocol conversion unit 32a generates a request data RQb1 by converting the request data RQa input via the interconnect 31a from the protocol A to the protocol B, as shown in FIG. 1A. In this case, a protocol conversion table 34a is used. Meanwhile, the protocol conversion unit 32c generates the request data RQb2 by converting the request data RQc input via the interconnect 31c from the protocol C to the protocol B. In this case, a protocol conversion table 34c is used.

The interconnector 33b selects either each data (RQb1, CRQa,PIDa,EDCa) of the first set or each data (RQb2, CRQc,PIDc,EDCc) of the second set and outputs it to the slave interface 40C. The slave interface 40C includes a request check unit 41C. Request check unit 41C, as shown in FIG. 5B, as compared with FIG. 1B, a point with comprising a plurality of verification protocol conversion unit 43a,43c, and a selector 46 is different.

In the FIG. 5B, when each data (RQb1,CRQa,PIDa, EDCa) of the first set is input, the error detection unit 42 detects an error of the copy data CRQa and the protocol identifier PIDa therein based on the error detection code EDCa. Similarly, when each data (RQb2,CRQc,PIDc, EDCc) of the second set is input, the error detection unit 42 detects an error of the copy data CRQc and the protocol identifier PIDc in the second set based on the error detection code EDCc.

Verification protocol conversion unit 43a, 43c are provided respectively corresponding to the protocol conversion unit 32a, 32c in the bus 30C. The verification protocol conversion unit 43a generates the first verification data VCRQb1 by protocol conversion of the copy data CRQa. At this time, for example, the same protocol conversion table 44a and protocol conversion table 34a provided in the protocol conversion unit 32a is used. The verification protocol conversion unit 43c generates the first verification data VCRQb2 by protocol conversion of the copy data CRQc. In this case, for example, the same protocol conversion table 44c as the protocol conversion table 34c provided in the protocol conversion unit 32c is used.

Selector 46 selects the verification protocol conversion unit for comparing the comparator 45 from among the two verification protocol conversion unit 43a, 43c, based on the protocol identifier PID. Specifically, the selector 46, when each data (RQb1,CRQa,PIDa,EDCa) of the first set is inputted, based on the protocol identifier PIDa therein, selects the first verification data VCRQb1 from the verification protocol conversion unit 43a. On the other hand, the selector 46 selects the first verification data VCRQb2 from the verification protocol conversion unit 43c based on the protocol identifier PIDc in the second set of data (RQb2,CRQc,PIDc, EDCc) when inputted.

Comparator 45 compares the first validation data VCRQx selected at selector 46 with the input request data (i.e., RQb1 or RQb2). Thus, by providing the identifier addition unit 23a, 23c, even when a plurality of bus masters 10a, 10c and the corresponding protocol conversion unit 32a, 32c using different protocols are provided, it is possible to protect the bus efficiently. As a way of protecting the bus, a step is added in which the master interface adds a protocol identifier to the copied data before or after any of the steps S102,S103 of FIG. 3.

(Modified Example of Semiconductor Device)

In FIG. 5A (and FIG. 1A), examples are shown in which the protocols used by bus masters 10a and 10c differ from those used by bus slaves 15. On the other hand, the system of FIG. 5A is applicable even when the protocol used by the bus master and the protocol used by the bus slave differ from each other and the same place coexist.

As a specific example, it is assumed that the bus master using protocol B is provided instead of the bus master 10c of the FIG. 5A. In this case, the master interface corresponding to the bus master outputs the request data based on protocol B, the copy data, the protocol identifier (ID), and the EDC. The outputs are then transmitted to the slave interface via the interconnect 33b without going through the protocol converter in the bus 30C.

Here, the slave interface 40C of the FIG. 5B may, for example, output the input copy data to the comparator 45 without going through the verification protocol conversion unit based on the protocol identifier (ID). That is, the selector 46, it may be added input validation protocol conversion unit is bypassed. Thus, even if the protocol of the bus master and the protocol of the bus slave are the same, an error in the request data input to the slave interface can be detected. In addition, even when the protocol used by the bus master and the protocol used by the bus slave coexist in the same place, it is possible to protect the bus using the same mechanism based on the protocol identifier (ID).

(Main Effects of Second Embodiment)

Thus, by using second embodiment method, the same effects as those of first embodiment can be obtained even when the bus masters 10a and 11c using different protocols are provided. The method of FIG. 5A and FIG. 5B can also be used in conjunction with the method of FIG. 4.

Although the invention made by the present inventor has been specifically described based on the embodiment, the present invention is not limited to the embodiment described above, and it is needless to say that various modifications can be made without departing from the gist thereof.

What is claimed is:

1. A Semiconductor device comprising:
    a bus master,
    a bus slave,
    a master interface provided between the bus master and a bus,
    a slave interface provided between the bus slave and the bus,
    a protocol conversion unit provided in the bus,
    wherein the bus master outputs a first data generated based on the first protocol,
    wherein the first data comprises a protocol conversion target data and a protocol conversion non-target data,
    wherein the master interface includes a copy data generation unit for generating a copy data by copying the protocol conversion target, and a code generation unit for generating an error detection code based on the copy data and the protocol conversion non-target data,
    wherein the protocol conversion unit generates a second data by converting the protocol conversion target data from the first protocol to the second protocol,
    wherein the slave interface inputs the second data, the conversion non-target data, the copy data, and the error detection code,
    wherein the slave interface includes an error detection unit for detecting an error of the copy data based on the error detection code, and a verification protocol conversion unit for generating the first verification data from by converting the copy data from one of the first protocol or the second protocol to the other, and a comparator for comparing the second verification data and the first verification data as the other of the second data or the copy data as a second verification data.

2. The semiconductor device according to claim 1, wherein the verification protocol conversion unit generates the first verification data by converting the first protocol to the second protocol using the same protocol conversion table as the protocol conversion table used in the protocol conversion unit for the copy data,
    wherein the comparator compares the second verification data with the first verification data, with the second data as the second verification data.

3. The semiconductor device according to claim 1, wherein the bus master is a processor and the bus slave is a memory controller.

4. A method for protecting a bus which connects a master interface provided between a bus master and a slave interface provided between a bus slave and the bus, the method comprising the steps of:
    (1) the bus master outputs a first data which comprises a protocol conversion target data and a protocol conversion non-target data, generated based on a first protocol,
    (2) the master interface generates a copy data by copying the protocol conversion target data,
    (3) the master interface generates an error detection code based on the copy data and the protocol conversion non-target data, (4) a protocol conversion unit in the bus generates the second data by converting the protocol conversion target data from the first protocol to a second protocol,
(5) the bus outputs the second data, the copy data, and the error detection code to the slave interface,
(6) the slave interface detects an error in the copy data based on the error detection code,
(7) the slave interface generates the first verification data by converting the copied data from one of the first protocol or the second protocol to the other,
(8) the slave interface compares the second verification data with the first verification data as the second data or the other of the copied data as a second verification data.

5. The method for protecting the bus according to claim 4,
the seventh step further includes: the slave interface generates the first verification data by converting the first protocol to the second protocol using the same protocol conversion table as the protocol conversion table used in the fourth step for the copy data,
the eighth step further includes: the slave interface compares the second verification data with the first verification data, with the second data as the second verification data.

\* \* \* \* \*